L. T. BOW.
COTTON SAMPLER'S CABINET.
APPLICATION FILED MAR. 12, 1909.

946,421.

Patented Jan. 11, 1910.
2 SHEETS—SHEET 1.

Witnesses

Inventor
Lafayette T. Bow,
By Chandler & Chandler
Attorneys

L. T. BOW.
COTTON SAMPLER'S CABINET.
APPLICATION FILED MAR. 12, 1909.
946,421.
Patented Jan. 11, 1910.
2 SHEETS—SHEET 2.
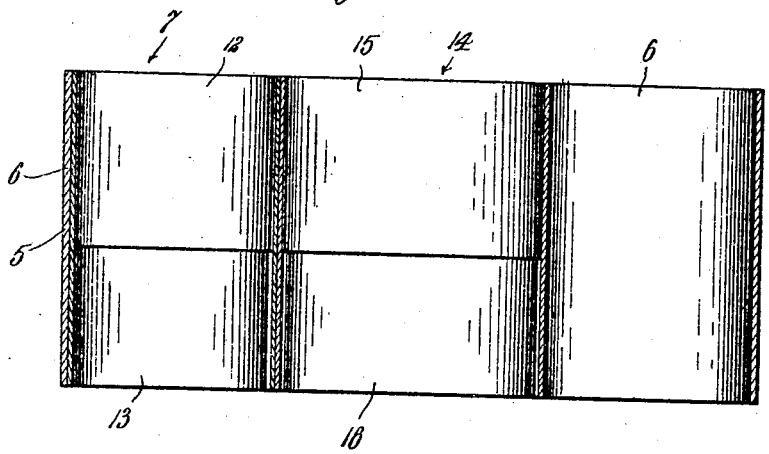
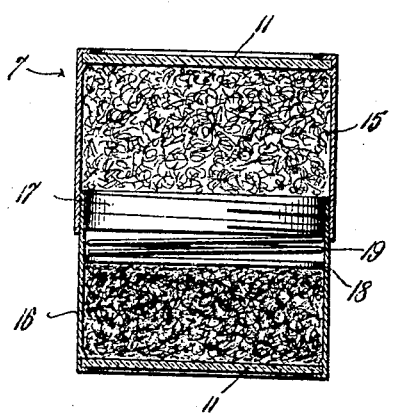
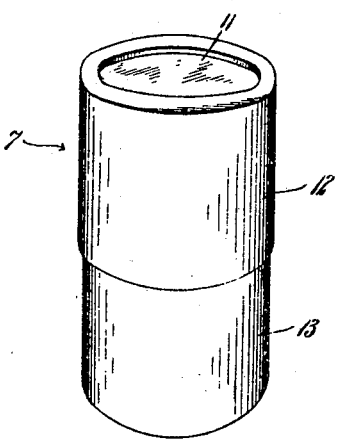
Witnesses
Inventor
Lafayette T. Bow,
By
Attorneys

UNITED STATES PATENT OFFICE.

LAFAYETTE T. BOW, OF ARDMORE, OKLAHOMA.

COTTON-SAMPLER'S CABINET.

946,421.

Specification of Letters Patent. Patented Jan. 11, 1910.

Application filed March 12, 1909. Serial No. 483,040.

*To all whom it may concern:*

Be it known that I, LAFAYETTE T. BOW, a citizen of the United States, residing at Ardmore, in the county of Carter, State of Oklahoma, have invented certain new and useful Improvements in Cotton-Samplers' Cabinets; and I do hereby declare the following to be a full, clear, and exact description of the invention, such as will enable others skilled in the art to which it appertains to make and use the same.

This invention has relation to cabinets, and has for its particular object the provision of a device of that kind which is designed to hold various grades of cotton in a manner to be easily seen by a prospective buyer.

The device aims to produce a cabinet into which may be placed cotton that has been officially tested, and when so placed may be sealed by the official who has conducted the test and each receptacle within the cabinet marked to indicate the grade of cotton it contains.

One object of the invention is to enable the producer to match his cotton and thereby determine the exact grade by comparing his cotton with the official samples.

A further object is the provision of a means wherein samples of loose and pressed cotton can be observed. And a still further object is the provision of a means for compressing the cotton within the receptacles.

With these and other objects in view, as will hereinafter become apparent, the present invention consists in certain novel details of construction and arrangement of parts, illustrated in the accompanying drawings and more particularly pointed out in the appended claims, it being understood that various changes in the form, proportion, size and minor details of the device may be made without departing from the spirit or sacrificing any of the advantages of the invention.

Figure 1:
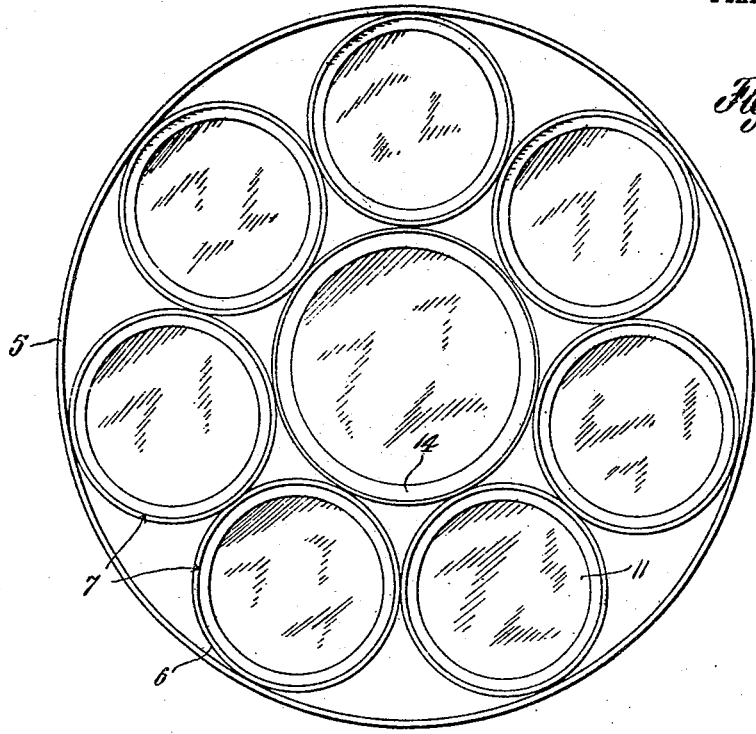
Figure 3:
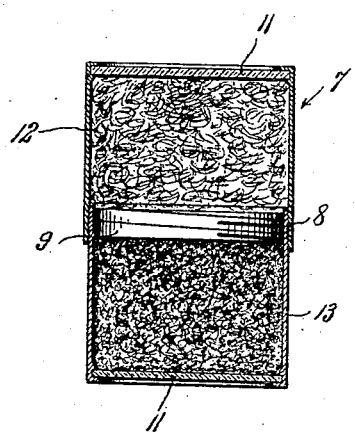

In the accompanying drawings, forming part of the specification: Figure 1 is a plan view of the device. Fig. 2 is a transverse sectional view of the same. Fig. 3 is a vertical Fig. 4 is a detailed perspective of the same. Fig. 5 is a vertical section of the central receptacle shown in Fig. 1.

Similar numerals of reference are employed to designate corresponding parts throughout.

In carrying out the invention I provide an outer casing 5 which is preferably of metal and circular in contour. Arranged within this casing are eight or more inner casings 6 which are designed to receive the cotton receptacles. Seven of these inner casings are arranged in a circular series within the outer casing 5 in such a manner that their peripheries engage with each other and with the inner surface of the outer casing 5; when in this position they are rigidly secured together by means of solder or the like. Owing to the disposition of the seven inner casings a central opening is presented and into this opening is inserted a somewhat larger casing, the periphery of which bears on the surrounding casings and is secured thereto by solder or the like. The function of this construction is to present a receptacle containing the seven grades of cotton now on the market, the central casing serving to receive the sample from the bale to be graded or matched. It is to be understood, however, that I am not to be limited to the number of receptacles, inasmuch as the number of grades into which cotton is classified is at present arbitrary, therefore I reserve the right to increase or decrease the number of inner casings and receptacles accordingly, as the number of grades increase or decrease.

The inner casings 6 are preferably of metal and cylindrical in contour, and of the same length as the outer casing 5 and like the latter are open at their ends. The said inner casings are each designed to receive what will subsequently be termed a cotton receptacle 7; these receptacles are of similar construction so that a description of one will suffice for all. Each receptacle is of a size to snugly fit within its respective casing and is formed of two hollow cylinders of unequal diameters, the larger (12) of which is interiorly provided at one end with a screw thread to engage the threaded end of the smaller (13), when the cylinders are connected as shown in Fig. 4 their combined lengths will be equal to that of the casings 6, or substantially so. The outer ends of the cylinders 12 and 13 are provided with glass closures 11, which are secured between spaced annular flanges formed on the inner faces and adjacent the outer edges of the cylinders. The inner end of the smaller receptacle 13 is interiorly provided with a screw thread 8 for the reception of a threaded plug 9.

By referring now to Fig. 1 it will be seen that a central receptacle is designated by the numeral 14, this member, like the members 7, is formed of two cylinders 15 and 16 as shown in Fig. 5 which are connected together in the manner before described and at either end are provided with glass closures similar to the closure 11, if preferred the closures for the receptacles may be magnifying lenses instead of plain glass for a purpose to be presently described. The smaller cylinder 16 of the central receptacle is at its inner end interiorly provided with a screw thread which engages a threaded plug 17, and slidingly fitted within the smaller receptacle is a disk 18, a coil spring 19 is interposed between the disk and plug which tends to force the disk to the opposite end of the receptacle.

In the use of the device the cotton to be graded or classed is placed within the central receptacle where its grade can be easily determined by matching with the various graded samples around it. As each grade is determined it is placed within its respective receptacle in which it may be seen in two states, viz, "compressed and loose", since it will be understood when the plug is removed from the receptacle and a quantity of cotton placed therein by inserting the plug 9 and screwing the same on the thread 8, the cotton will be compressed against the cover through which it may be seen in that state from one end of the receptacle, the remainder of the receptacle may be filled with what is known as loose cotton and the cylinders secured as shown in the drawings. When the parts are in this position the official who has conducted the test and graded the cotton may in any suitable manner seal the joints and attest that the contents of each receptacle is of a certain grade.

The advantages of this device will be greatly appreciated by cotton growers in general since it will enable each grower to display the character of the various grades of his cotton to prospective buyers. The transparent cap or cover of each receptacle may be as before stated, a lens which will magnify the contents or plain glass may be used as desired.

If desired each of the smaller receptacles may be fitted with a spring and disk similar to the construction illustrated in Fig. 5, this construction insuring a greater compression with a smaller amount of cotton than if no spring were used.

By means of this invention the various grades of cotton can be kept dust-proof, while they can be seen, and farmers can readily grade their cotton by matching it with the grades that are carried in the cabinet. Cotton cannot be graded or classified in the sun or even out in the open air accurately. It must be done in a room properly lighted, and the light should come from the north and fall on the cotton. But as the same cause produces the same effect after the grades are placed in the cabinet the farmer can readily grade his cotton by matching it with the samples in the receptacle. The farmer places a sample of his cotton in the middle receptacle and by means of the transparent cover can see at once what grade he has. By making the receptacles double so that the samples may be seen from either side of the cabinet, I can display a large number of samples, i. e. soft samples on one side of the cabinet, and hard samples on the other. Preferably the receptacles are sent to the official classifier to be filled with samples and the plug is used to press the samples up against the glass and hold it in place. After filling the classifier seals the receptacles. Where the cabinet is to exhibit samples on both sides, as hard pressed cotton on one side and soft cotton on the other, the receptacles have to come apart and have a glass in each end.

Having thus described the invention, what is claimed as new, is:—

1. In a cotton sampler's cabinet the combination of an outer casing and a series of inner casings secured therein, with a similar series of cotton holding receptacles provided with transparent covers in said inner casings, substantially as described.

2. In a cotton sampler's cabinet the combination of a casing, and a series of removable receptacles in said casing each provided with transparent ends and an intermediate plug, substantially as described.

3. In a cotton sampler's cabinet a receptacle having transparent end covers, a plug and a spring-pressed plunger disposed within said receptacle, substantially as described.

4. In a cotton sampler's cabinet the combination of a central casing, and a series of casings surrounding the same; with a removable receptacle in the central casing adapted to contain cotton to be sampled, and a removable receptacle in each of the outer casings adapted to contain graded cotton, for the purpose set forth.

In testimony whereof, I affix my signature, in presence of two witnesses.

LAFAYETTE T. BOW.

Witnesses:
J. W. HARRELD,
W. T. WARD.